United States Patent [19]

Neuwirth et al.

[11] Patent Number: 4,881,255

[45] Date of Patent: Nov. 14, 1989

[54] PROTECTOR MODULE FOR QUICK CLIP TERMINAL TELEPHONE CONNECTOR BLOCKS

[75] Inventors: Helmuth Neuwirth, Garden City; Carl H. Meyerhofer, Dix Hills, both of N.Y.

[73] Assignee: Porta Systems Corp., Syosset, N.Y.

[21] Appl. No.: 245,574

[22] Filed: Sep. 19, 1988

[51] Int. Cl.[4] ................................................ H02H 9/04

[52] U.S. Cl. .................................... 379/412; 379/332; 361/119; 361/129; 361/120; 337/29

[58] Field of Search ........................ 379/412, 331, 332; 337/29, 32, 34; 361/120, 119, 129, 130

[56] References Cited

U.S. PATENT DOCUMENTS

| | | | |
|---|---|---|---|
| 4,086,648 | 4/1978 | Hines et al. | 361/120 X |
| 4,424,546 | 1/1984 | Smith | 337/34 X |
| 4,649,456 | 3/1987 | DeLuca et al. | 361/120 X |
| 4,729,055 | 3/1988 | Dorival et al. | 361/120 X |

*Primary Examiner*—James L. Dwyer

*Attorney, Agent, or Firm*—Charles E. Temko

[57] ABSTRACT

An improved telephone subscriber circuit protector module particularly suited for use in interconnecting with protector blocks having exposed quick clip terminals on an exposed surface thereof. The module features a relatively few number of metallic parts, and can be assembled with a series of simple hand operations. A three-element gas tube is employed in which the contacts are formed with elongated extensions, the extensions providing interconnections with contacts in such manner as to maintain the contacts in operative position when the module is assembled.

3 Claims, 3 Drawing Sheets

PROTECTOR MODULE FOR QUICK CLIP TERMINAL TELEPHONE CONNECTOR BLOCKS

BACKGROUND OF THE INVENTION

This invention relates generally to the field of telephone subscriber circuit protection, and more particularly to an improved protector module suitable for use in conjunction with telephone protector blocks having exposed quick clip terminals which are employed for protector module engagement.

In recent years, there has been a great increase in the use of quick clip terminals to form interconnections on telephone connector and protector blocks in lieu of older type of interconnections, typically, wire wrap pins. Using quick clips, connections are made with an installation tool which forces the ends of conductors into the quick clips, which simultaneously display insulation from the conductors to provide electrical conductivity.

Conventional subscriber circuit modules normally are interconnected on areas on the block provided for that purpose, and are equipped with pins for engaging corresponding recesses or sockets for receiving corresponding pins. The provision of such module-engaging area significantly diminishes the effective subscriber pair density available on the block. Quick clip type blocks, in order to increase the available subscriber per density thereof, normally do not provide these areas, and where protection of the respective circuits is desired, the individual protector modules must be configured to directly engage the exposed ends of the quick clip terminal.

SUMMARY OF THE INVENTION

Briefly stated, the invention contemplates the provision of an improved protector module of the class described which is particularly adapted to engage the exposed ends of quick clip terminals on a connector block, rather than the pin type interconnection which it replaces. The disclosed embodiment is characterized in that the internal parts of the module include a molded base and a plurality of stamped metallic contacts which are readily assembled using ordinary hand skills. A novel three element gas tube having radially projecting electrodes engages these metallic parts in such manner that when the module casing is closed, the gas tubes serve to maintain the contacts in operative condition.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
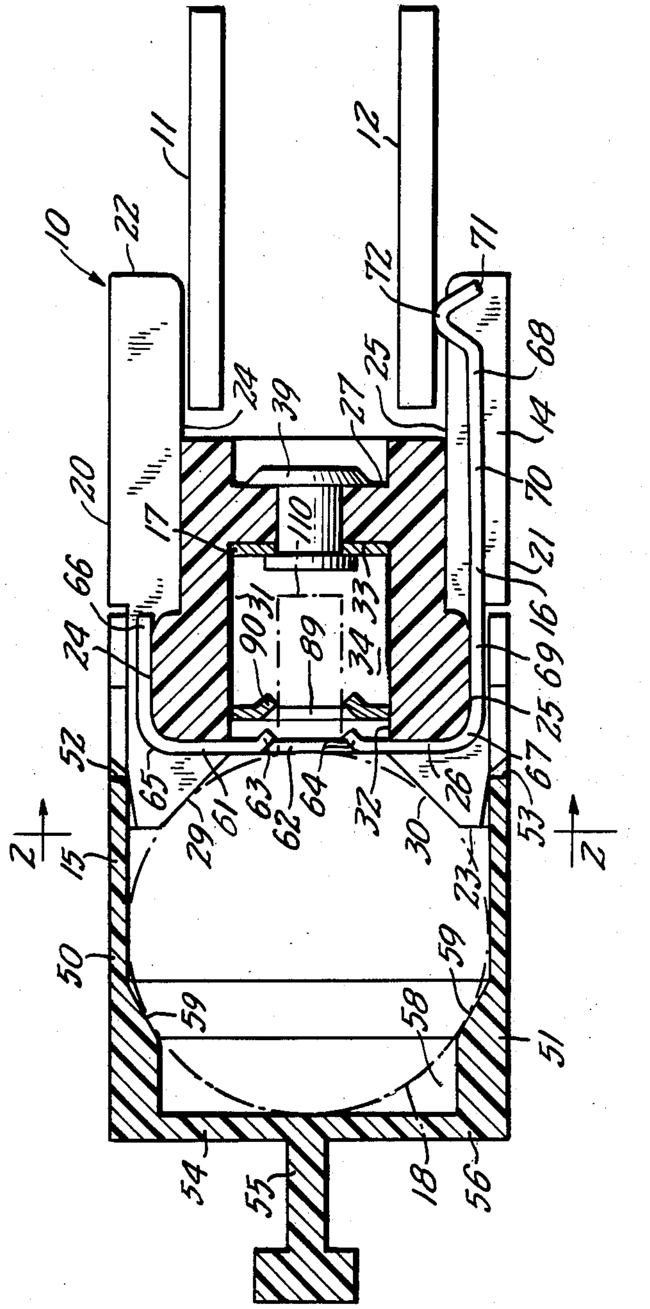
FIG. 1 is a transverse sectional view of an embodiment of the invention as seen from the plane 1—1 in FIG. 2.
Figure 2:
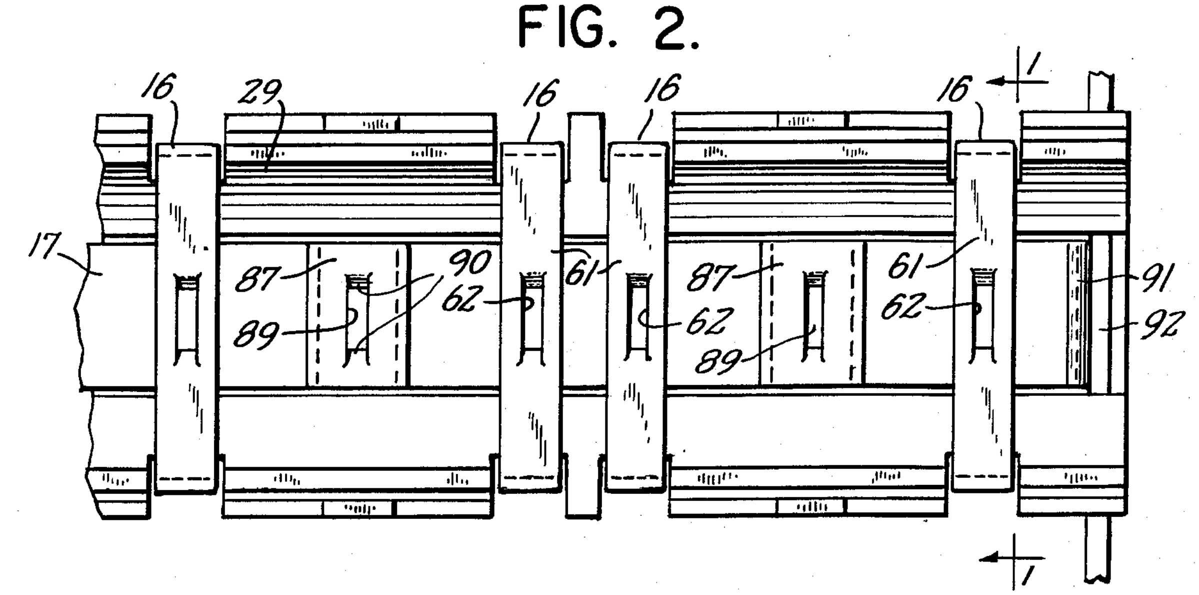
FIG. 2 is a horizontal sectional view thereof as seen from the plane 2—2 in FIG. 1.

In accordance with the invention, the device, generally indicated by reference character 10 (See FIG. 1) is adapted to engage adjacent first and second quick clip connectors 11 and 12 which extend outwardly from an exposed surface of a telephone connector block (not shown). The device comprises broadly: a base element 14, a cover element 15, a plurality of resilient contact elements 16, a plurality of ground contact elements 17, and a plurality of three-element gase tubes 18.

The base element 14 is most suitably formed as an elongated synthetic resinous molding, and is bounded by first and second side surfaces 20 and 21, first and second end surfaces 22 and 23, first and second inner side surfaces 24 and 25, and an inner transverse surface 26 which form a recess 27 for the reception of connectors 11 and 12.

At an opposite end of the base element, inner converging surfaces 29 and 30 communicate with third and fourth inner side surfaces 31 and 32 and a second inner transverse surface 33 to form a recess of generally rectangular cross section indicated by reference character 34.

Figure 9:
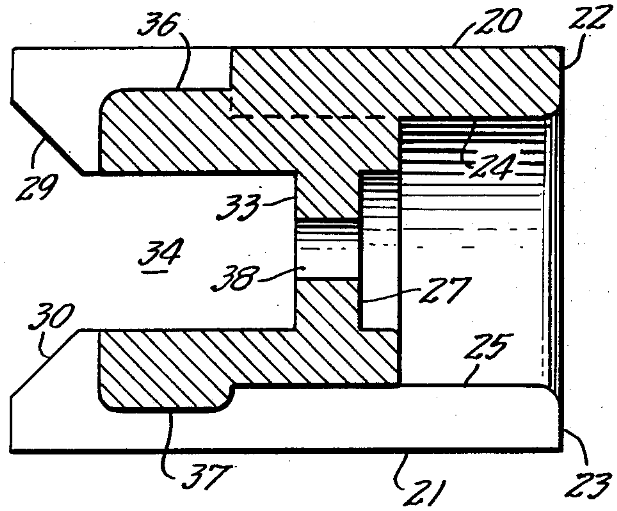
FIG. 9 is a transverse sectional view as seen from the plane 9—9 in FIG. 8.
Figure 10:
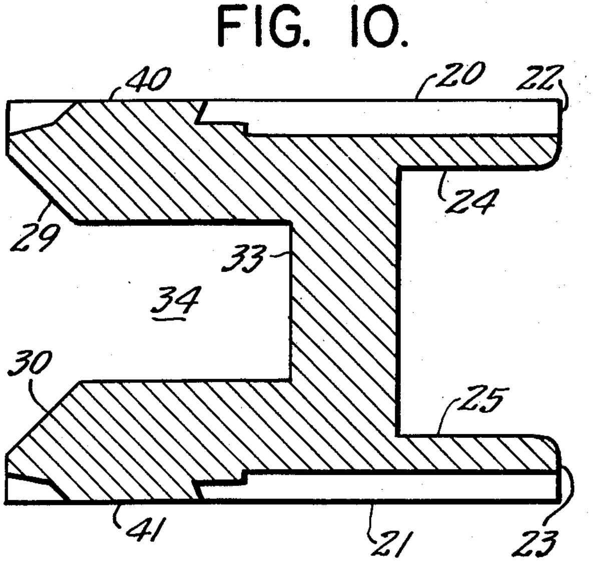
FIG. 10 is a transverse sectional view as seen from the plane 10—10 in FIG. 8.

Reference is made to FIG. 9. To accommodate the resilient contact element 16, there are provided first and second recesses 36 and 37. Counter sunk bores 38 accommodate rivets 39 which secure the ground contact elements 17 upon the base element 14, as will more fully appear hereinafter. Referring to FIG. 10, projections 40 and 41 provide means for maintaining the cover element 15 in position upon the base element 14.

The cover element 15 is also of synthetic resinous molded construction, and includes first and second side walls 50 and 51 having detent recesses 52 and 53 thereon, and an end wall 54 supporting an integrally molded handle 55. Side walls, one of which is indicated by reference character 56 cooperate with walls 50 and 51 to form a recess 58 having stepped surfaces 59 for engaging the gas tube element 18.

Figure 6:
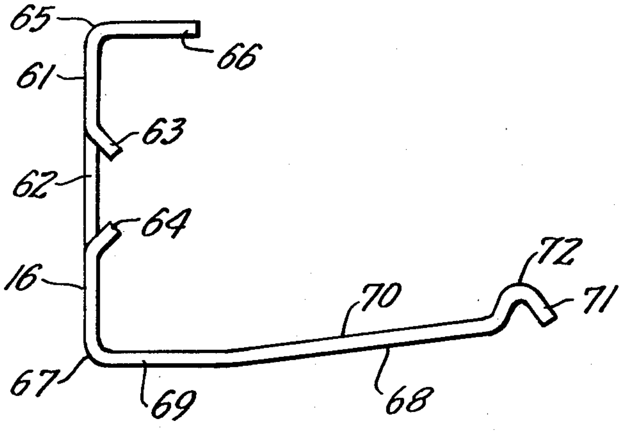
FIG. 6 is a view in elevation of a spring contact forming part of the disclosed embodiment.
Figure 7:
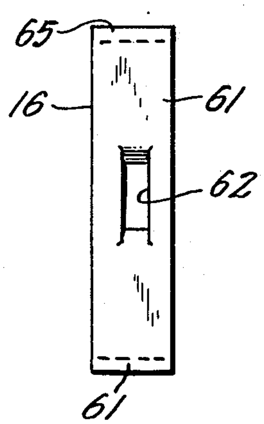
FIG. 7 is a view in elevation thereof as seen from the left-hand portion of FIG. 6.
Figure 8:
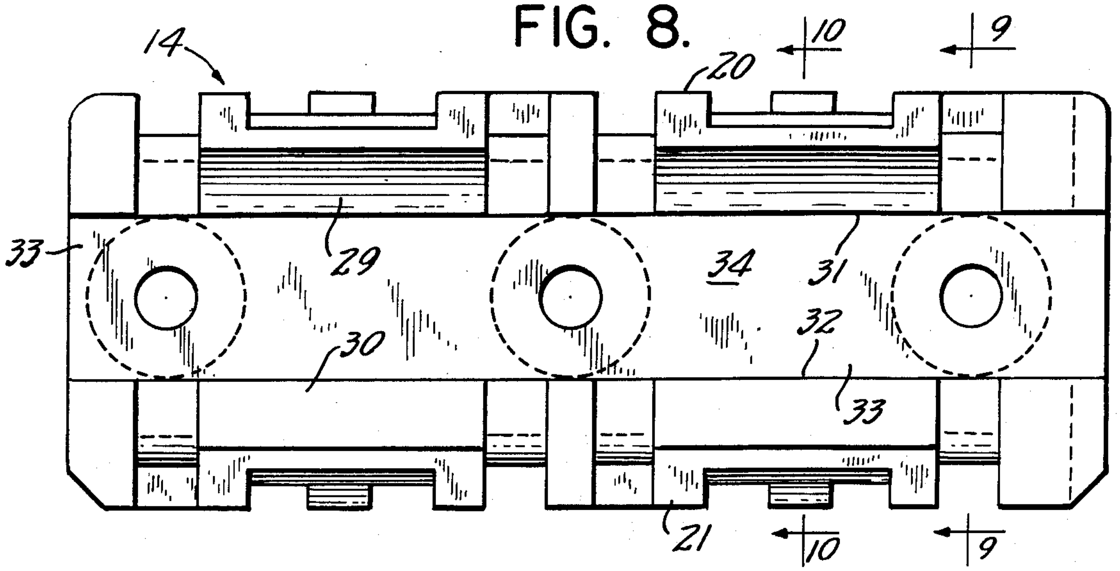
FIG. 8 is an end elevational view of a module base forming a part of the disclosed embodiment.

The resilient contact elements 16 are preferably formed as phosphor bronze stampings, and are best understood from a consideration of FIGS. 1, 6 and 7. Each includes a base portion 61 having a centrally disposed rectangular opening 62 formed by resilient tabs 63 and 64. Extending from the base portion is a first bent portion 65 having a resilient arm 66 thereon, as well as a second bent portion 67 leading to an elongated arm 68 having a first segment 69 parallel to the arm 66 and a second portion 70 leading to a curved tip 71 having a contact surface 72.

Figure 3:
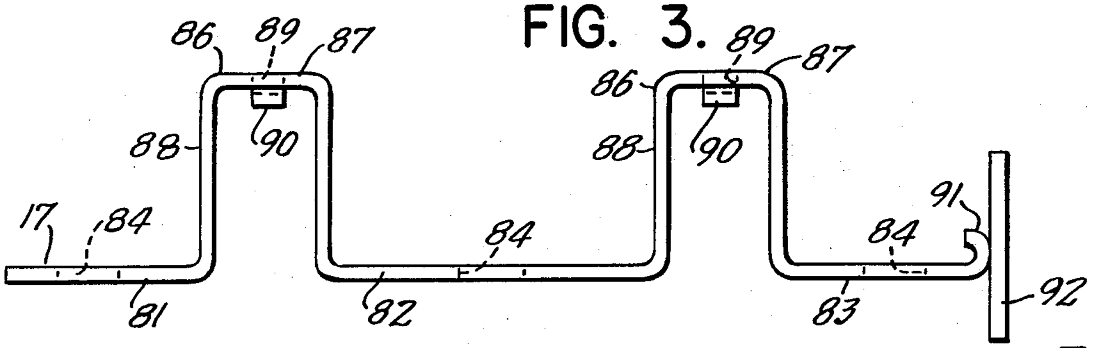
FIG. 3 is a view in elevation of a ground strip forming part of the disclosed embodiment.
Figure 4:
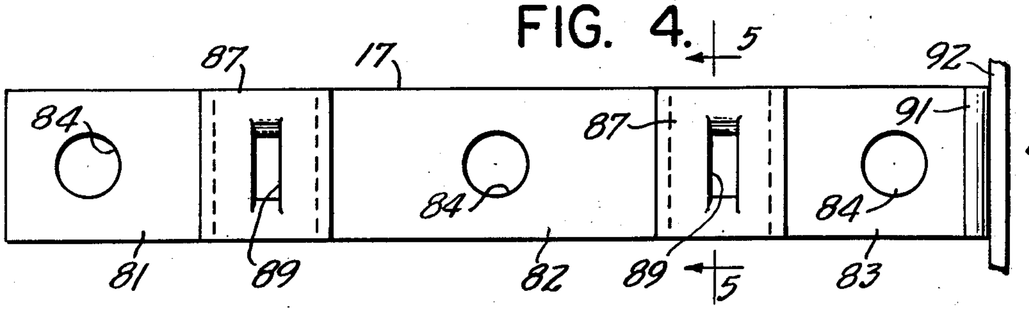
FIG. 4 is, a view in elevation of the ground strip as seen from the upper portion of FIG. 3.
Figure 5:
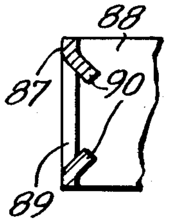
FIG. 5 is a fragmentary sectional view as seen from the plane 5—5 in FIG. 4.

The ground contact elements 17 are also formed as phosphor bronze stampings, and are best understood from a consideration of FIGS. 3, 4 and 5. Each element includes three coplanar segments 81, 82 and 83 having openings 84 for accommodating rivets 39, as well as U-shaped segments 86 including lateral walls 87 and longitudinal walls 88 forming slotted openings 89 having resilient tabs 90. A curved end terminal 91 forms part of coplanar segment 83 and is adapted to resiliently contact a ground strip 92 forming part of a block upon which the module is mounted.

Figure 11:
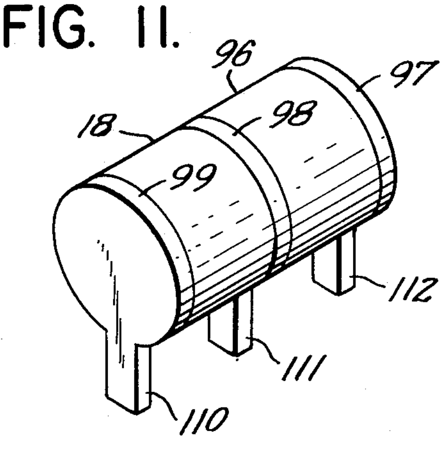
FIG. 11 is a view in perspective of a gas tube element forming part of the embodiment.
Figure 12:
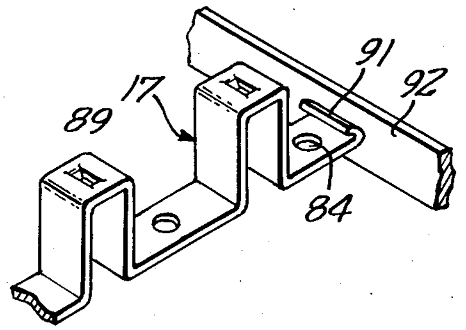
FIG. 12 is a view in perspective showing the connecting of a ground contact with a source of ground potential.

The three-element gas tubes 18 illustrated in FIG. 11, include a generally conventional circular body 96 having first, second and third electrodes 97, 98 and 99 thereon. As contrasted with conventional three-element gas tubes, each of the contacts includes a radially extending projection 110, 111 and 112 which are adapted to penetrate the openings in the elements 16 and 17.

Assembly of the device will be readily apparent from a consideration of FIG. 1. Normally, the ground contact element 17 will be first fastened in position using the rivets 39, and the resilient contact element 16 may then be pushed onto the base element to be resiliently retained by frictional contact of the arms 66 and 68. Following this, the gas tube elements are engaged by pushing the projections 110–112 through the openings in the elements 16 and 17 which have previously been aligned, and engagement of the cover element 15 with the base element 14 serves to urge the gas tube elements against the resilient contact element 16 to assure adequate electrical communication. Once the cover element 15 has been engaged, the resilient contact elements will remain in the position shown in FIG. 1, even in the absence of any frictional contact between them and the base element.

It is to be noted that except for the setting of the rivets 39, the remainder of the assembly of the module requires only hand manipulation, without the use of any tools whatsoever.

It may thus be seen that we have invented a new and highly useful protector module, particularly suited for use with quick clip connector blocks which can be formed entirely from molded and stamped components, and which can be assembled by those having only ordinary hand skills, with resulting low cost of manufacture, and consequent wide distribution and use.

We wish it to be understood that we do not consider the invention to be limited to the precise details of structure shown and set forth in this specification, for obvious modifications will occur to those skilled in the art to which the invention pertains.

We claim:

1. An improved subscriber circuit protector module for use with quick clip type telephone connector blocks comprising: a base element having a quick clip receiving recess therein, a cover element partially overlying said base element, a plurality of elongated quick clip contact elements at least partially surrounding said base element and resiliently maintained thereon, said contact elements having a resilient arm thereon extending into said quick clip retaining recess in said base element and defining a resilient opening in a base portion thereof; said base element having a second recess therein, a ground contact element secured within said recess and having resilient openings therein in aligned relation relative to said openings in said clip contact elements; at least one three-element gas tube having elongated electrodes extending radially from a principal axis thereof, said electrodes each penetrating an opening in one of said clip contact elements and an opening in said ground contact element to establish electrical communication from said quick clip contact element to said ground contact element, said ground contact element having a free end thereon extending outwardly of said base element for communicating with a source of ground potential.

2. A protector module in accordance with claim 1, further characterized in said ground contact element being secured to said base element by rivet means.

3. A protector module in accordance with claim 1, further characterized in said cover element defining an enclosed cavity with said base element having inner surfaces bearing upon the electrodes of said gas tube element and serving to maintain said electrodes in contact with said clip contact elements.

* * * * *